United States Patent [19]

Takeuchi et al.

[11] Patent Number: 5,374,371
[45] Date of Patent: * Dec. 20, 1994

[54] LIQUID CRYSTAL DEVICE

[75] Inventors: Kiyofumi Takeuchi; Haruyoshi Takatsu, both of Tokyo, Japan

[73] Assignees: Kawamura Institute of Chemical Research, Sakaura; Dainippon Ink And Chemicals, Inc., Tokyo, both of Japan

[*] Notice: The portion of the term of this patent subsequent to Apr. 19, 2011 has been disclaimed.

[21] Appl. No.: 98,231

[22] Filed: Jul. 29, 1993

Related U.S. Application Data

[63] Continuation of Ser. No. 403,956, Sep. 7, 1989, abandoned.

[30] Foreign Application Priority Data

| | | | |
|---|---|---|---|
| Sep. 8, 1988 | [JP] | Japan | 63-223600 |
| Sep. 12, 1988 | [JP] | Japan | 63-227781 |
| Sep. 13, 1988 | [JP] | Japan | 63-229230 |
| Sep. 13, 1988 | [JP] | Japan | 63-229231 |
| Sep. 13, 1988 | [JP] | Japan | 63-229232 |
| Sep. 24, 1988 | [JP] | Japan | 63-239345 |
| Feb. 1, 1989 | [JP] | Japan | 1-23151 |
| Feb. 1, 1989 | [JP] | Japan | 1-23152 |
| Apr. 13, 1989 | [JP] | Japan | 1-91900 |

[51] Int. Cl.⁵ .............. C09K 19/52; C09K 19/06; G02F 1/13
[52] U.S. Cl. .............. 252/299.01; 252/299.61; 252/299.63; 252/299.64; 252/299.65; 252/299.66; 252/299.67; 359/51; 359/52; 359/102; 428/1

[58] Field of Search ............ 252/299.01, 299.5, 299.61, 252/299.63, 299.64, 299.65, 299.66, 299.67; 359/51, 52, 102; 428/1

[56] References Cited

U.S. PATENT DOCUMENTS

| | | | |
|---|---|---|---|
| 3,687,515 | 8/1972 | Haas et al. | 252/408 |
| 4,285,829 | 8/1981 | Eidenschink et al. | 252/299.63 |
| 4,435,047 | 3/1984 | Fergason | 359/52 |
| 4,707,080 | 11/1987 | Fergason | 252/299.01 |
| 4,992,201 | 2/1991 | Pearlman | 252/299.1 |

FOREIGN PATENT DOCUMENTS

| | | |
|---|---|---|
| 0033947 | 8/1981 | European Pat. Off. |
| 0156615 | 10/1985 | European Pat. Off. |
| 0176039 | 4/1986 | European Pat. Off. |
| 0232052 | 8/1987 | European Pat. Off. |
| 0258868 | 3/1988 | European Pat. Off. |
| 0313053 | 4/1989 | European Pat. Off. |
| 3606153 | 8/1987 | Germany |

*Primary Examiner*—Sheam Wu
*Attorney, Agent, or Firm*—Armstrong, Westerman, Hattori, McLeland & Naughton

[57] ABSTRACT

A liquid crystal device which comprises a pair of substrates having an electrode layer, at least one of said substrates being transparent, and a light-control layer supported between the substrate is disclosed, wherein said light-control layer comprises a continuous liquid crystal phase composed of a nematic liquid crystal material and a transparent solid substance having the three dimensional network existing in said continuous liquid crystal phase, said nematic liquid crystal material having an optical anisotropy ($\Delta n$) ranging from 0.18 to 0.3 and a dielectric anisotropy ($\Delta \epsilon$) ranging from 15 to 30. The device can be driven at a low voltage to provide a display of sufficient contrast and is applicable to a multiplexing drive system.

38 Claims, No Drawings

LIQUID CRYSTAL DEVICE

This application is a continuation of application Ser. No. 07/403,956 filed Sep. 7, 1989, now abandoned.

FIELD OF THE INVENTION

This invention relates to a liquid crystal device capable of making a large area display. More particularly, it relates to a liquid crystal device in which visual field control (i.e., cutoff or opening of a field of view) or light control (i.e., transmission or screening of light) can be effected electrically. The device of the present invention is useful as a screen for cutting a view or a curtain for light control in windows of buildings or show-windows. The device is also useful as a display such as an advertising panel, a guiding panel, a decorative display panel, etc. on which letters or figures are electrically displayed and changed in a short response time.

BACKGROUND OF THE INVENTION

Liquid crystal display elements now in practical use include a twisted nematic (TN) mode and a super twisted nematic (STN) mode. Display cells utilizing ferroelectric liquid crystals have also been proposed. These display cells essentially contain a polarizing sheet and require orientation treatment.

There is also known a process for producing a liquid crystal device capable of making a large, bright, and high contrast display at low cost without requiring a polarizing sheet or orientation treatment, in which a polymer matrix having dispersed therein encapsulated droplets of a liquid crystal material is formed into a thin film (hereinafter referred to as a polymer-encapsulted type device) as disclosed in JP-A-58-501631 (the term "JP-A" as used herein means an "unexamined published Japanese patent application") and U.S. Pat. No. 4,435,047. The encapsulating material proposed includes gelatin, gum arabic, polyvinyl alcohol, etc.

According to this technique, when liquid crystal molecules encapsulated with polyvinyl alcohol exhibit positive dielectric anisotropy in a film, they are orientated in the direction of an electric field in which they are placed, and exhibits transparency if a refractive index $n_o$ of the liquid crystal is equal to a refractive index $n_p$ of the polymer. On removal of the electric field, the liquid crystal molecules are not aligned and the refractive index of the liquid crystal droplets is shifted from $n_o$. As a result, light is scattered at the interface of liquid crystal droplets and inhibited from transmission to make the film white turbid.

There are several other proposals using a polymer film having dispersed therein microcapsulted liquid crystal droplets. For example, JP-A-61-502128 discloses liquid crystals dispersed in an epoxy resin, and JP-A-62-2231 discloses liquid crystals dispersed in a specific ultraviolet-cured polymer.

The characteristics demanded for the aforesaid large-area liquid crystal devices in application to practical use are (1) that they can be driven at a low voltage; (2) that they provide a display of sufficient contrast; and (3) that they can be applied to a multiplexing drive system.

The characteristics (1) and (3) are of particular importance for reducing the cost incurred for the driving part of the device. However, there has not yet been developed a liquid crystal device which does not need a polarizing sheet and still-meet these requirements.

SUMMARY OF THE INVENTION

One object of this invention is to provide a liquid crystal device which can be designed to have a large area, does not require a polarizing sheet, and can be driven at a far lower voltage than in the conventional large-area liquid crystal devices.

The inventors have conducted extensive investigations on a combination of a liquid crystal device structure and a chemical property of a liquid crystal material used in the device. As a result, it has now been found that the above object of this invention can be accomplished by a liquid crystal device which comprises a pair of substrates having an electrode layer, at least one of them being transparent, and a light-control layer supported between the substrates, wherein said light-control layer comprises a continuous liquid crystal phase composed of a nematic liquid crystal material and a transparent solid substance having the three dimensional network existing in said continuous liquid crystal phase, said nematic liquid crystal material having an optical anisotropy ($\Delta n$) ranging from 0.18 to 0.3 and a dielectric anisotropy ($\Delta \epsilon$) ranging from 15 to 30.

DETAILED DESCRIPTION OF TEE INVENTION

In a preferred embodiment of the above-described liquid crystal device, the nematic liquid crystal material whose optical anisotropy ($\Delta n$) is in the range of from 0.18 to 0.3 can be obtained by using a nematic liquid crystal compound whose optical anisotropy ($\Delta n$) is in the range of from 0.19 to 0.4 into said nematic liquid crystal material.

In another preferred embodiment, the nematic liquid crystal material whose dielectric anisotropy ($\Delta \epsilon$) is in the range of from 15 to 30 can be obtained by using a nematic liquid crystal compound whose dielectric anisotropy is in the range of from 25 to 50 into said nematic liquid crystal material.

Of these nematic liquid crystal compounds, preferred are those represented by formulae (I) to (XII):

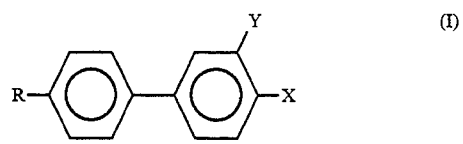
(I)

wherein R represents a straight chain alkyl, alkoxyl or alkenyl group having from 1 to 10 carbon atoms; X represents a fluorine atom or a cyano group; and Y represents a hydrogen atom or a fluorine atom.

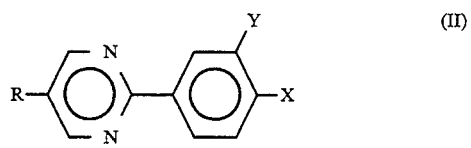
(II)

wherein R, X, and Y are as defined above.

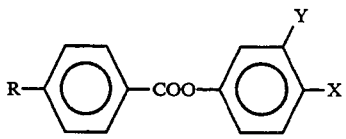

wherein R, X, and Y are as defined above.

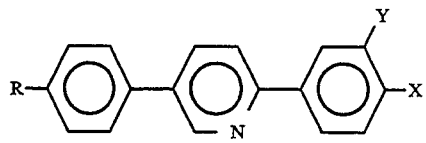 (II)

wherein R, X, and Y are as defined above.

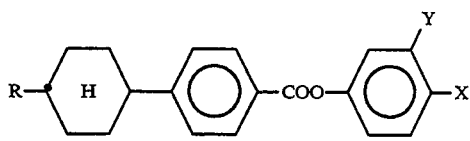 (III)

wherein R, X, and Y are as defined above.

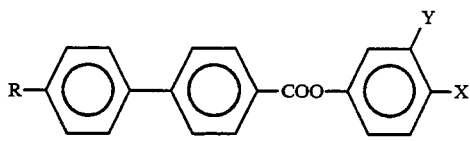 (IV)

wherein R, X, and Y are as defined above.

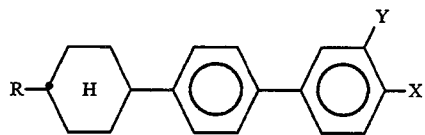 (V)

wherein R, X, and Y are as defined above.

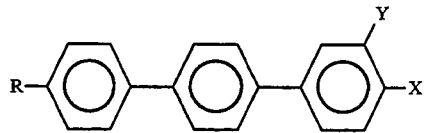 (VI)

wherein R, X, and Y are as defined above.

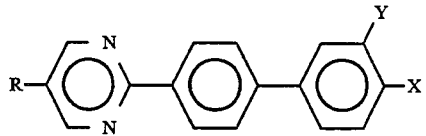 (VII)

wherein R, X, and Y are as defined above.

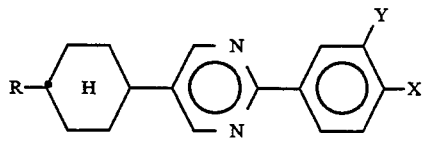 (VIII)

wherein R, X, and Y are as defined above.

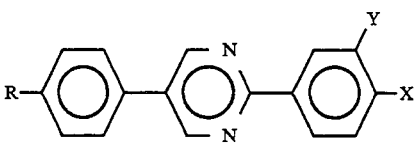 (IX)

wherein R, X, and Y are as defined above.

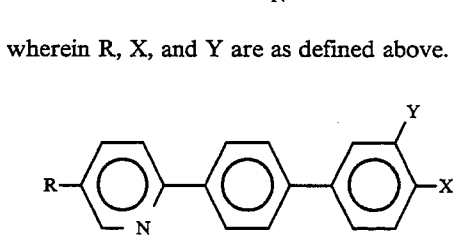 (X)

wherein R, X, and Y are as defined above.

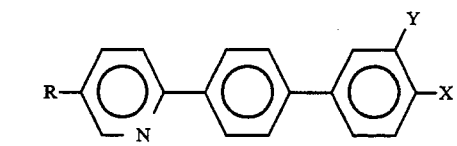 (XI)

wherein R, X, and Y are as defined above.

In particularly preferred embodiments of the present invention, the nematic liquid crystal material contains a combination of (a) a compound selected from the compounds represented by formulae (I) and (II) and (b) a compound selected from the compounds represented by formulae (IV), (V), (VI), (VII), (VIII), (IX), (X), and (XI), or a combination of (a) a compound selected from the compounds represented by formula (III) and (b) a compound selected from the compounds represented by formulae (VII) and (VIII).

The above-described combinations of the nematic liquid crystal compounds provide nematic liquid crystal materials having Δn and Δε ranging from 0.18 to 0.3 and from 15 to 30, respectively, which lead to production of a liquid crystal device applicable to a multiplexing drive system in a broad temperature range inclusive of room temperature.

The respective lowest values of Δn and Δε, that is 0.18 and 15, are requisite to achieve the aforesaid characteristics (1), (2) and (3). 0.3 of Δn and 30 of Δε for a final nematic liquid crystal product are the highest limit values which can be achieved by using the aforesaid nematic liquid compounds.

The substrate which can be used in the present invention may be either a rigid material, such as glass and metallic plates, or a soft material, e.g., plastic films. A pair of substrates face to each other with an appropriate gap therebetween. In general, the gap between the substrates is preferably held by means of a spacer commonly employed in well-known liquid crystal devices.

At least one of the two substrates should be transparent so that the light-control layer supported therebetween could be seen from the outside. The transparent substrate is not essentially required to be completely transparent. In cases where the liquid crystal device is designed to act on light transmitted from one side of the device to the other side, both substrates should have adequate transparency. If desired, an appropriate electrode either transparent or opaque may be provided on a part or the entire surface of the substrate.

Between the two substrates are supported a light-control layer comprising a liquid crystal material and a transparent solid substance.

The liquid crystal material to be used should form a continuous phase between the two substrates. To this effect, the proportion of the liquid crystal material in the light-control layer is preferably 60% by weight or more, more preferably in the range of from 70 to 90% by weight. If it is too small, there is a tendency toward difficulty in forming a continuous phase of the liquid crystal material between the two substrates.

The transparent solid substance present in the continuous phase of the liquid crystal material has the three dimensional network to form an optical interface between the substance and the liquid crystal material thereby causing light scattering. Transparency of the transparent solid substance can be appropriately selected depending on the end-use of the device. The term "solid" as used herein is meant to include not only rigid and hard substances but also flexible, soft or elastic substances as far as they meet the purpose. In the case of using particulate solid substance, should the particle size be too large or too small as compared with light wavelengths, light scattering performance cannot be achieved. Otherwise, the particle size or shape may be selected appropriately depending on the purpose.

The transparent solid substance preferably includes synthetic resins. The synthetic resin preferably include those synthesized from ultraviolet-curable monomer or oligomers.

The above-described liquid crystal device according to the present invention can be produced preferably by a process comprising introducing a mixed solution comprising essentially the aforesaid liquid crystal material and ultraviolet-curable polymerizable monomer(s) or oligomer(s) and, as optional components, a polymerization initiator, a chain transfer agent, a photosensitizer, a dye, a crosslinking agent, etc. between a pair of substrates having an electrode layer, at least one of them being transparent, and polymerizing said monomer or oligomer by ultraviolet irradiation through the transparent substrate to form a light-control layer in which the liquid crystal material constitutes a continuous phase with a transparent solid substance having the three dimensional network being present in said continuous phase.

The ultraviolet-curable polymerizable monomers or oligomers which can be used in the process are not particularly limited as long as they are cured on ultraviolet irradiation to form a transparent solid substance having the three dimensional network in the continuous phase of the liquid crystal material.

Preferred examples of such a polymerizable monomer are trimethylolpropane triacrylate, tricyclodecanedimethylol diacrylate, polyethylene glycol diacrylate, polypropylene glycol diacrylate, hyxanediol diacrylate, neotenyl glycol diacrylate, and tris(acryloxyethyl) isocyanurate.

Preferred examples of such a polymerizable oligomer are caprolactone-modified hydroxypivalic esters and neopentyl glycol diacrylate.

If desired, the mixture providing a light-control layer may further contain a polymerization initiator, a chain transfer agent, a photosensitizer, a dye, a crosslinking agent, and so on as selected in conformity with the kinds of the polymerizable monomer or oligomer, or desired performances of the device.

In particular, a combined use of a chain transfer agent produces a marked effect, though dependent on the kind of the polymerizable monomer or oligomer, in preventing excessive crosslinking of the resin to ensure sensitivity of the liquid crystal material to the applied electric field and to thereby exhibit excellent display characteristics at a low drive voltage. Preferred examples of the chain transfer agent are butanediol dithiopropionate, pentaerythritol tetrakis($\beta$-thiopropionate), and triethylene glycol dimercaptane. The amount of the chain transfer agent to be added varies depending on the kind of the monomer or oligomer used. Too a small amount brings about little effects, and too a large amount tends to reduce transparency of the device, resulting in deteriorated contrast of the display. A recommended effective amount of the chain transfer agent ranges from about 0.05 to 30% by weight, preferably from 0.1 to 20% by weight, based on the monomer or oligomer.

The mixed solution comprising the above-enumerated components can be introduced between the two substrates by infusion into the gap or coating on one of the substrates by means of a coater, e.g., a spinner, and laminating the other substrate thereon.

The uncured solution can be cured by irradiating a proper dose of ultraviolet light through the transparent substrate. Ultraviolet light may be replaced by heat or electron rays depending on the kind of the monomer, oligomer or other optional components.

The thickness of the light-control layer is usually adjusted in a range of from 5 to 30 $\mu$m.

The thus produced liquid crystal device according to the present invention can be driven by a multiplexing drive system that has been impossible with the conventional polymer-encapsulated type liquid crystal devices. Further, the device of the present invention can be driven at a low voltage, exhibits fast response, and provides a high contrast display.

More specifically, while the conventional polymer-encapsulated type liquid crystal devices require a driving voltage of no less than 60 Vrms, mostly no less than 100 Vrms, for driving, the liquid crystal device according to the present invention shows a rise response time of 3 to 6 msec and a decay response time of 3 to 6 msec at a driving voltage of about 20 Vrms.

The present invention is now illustrated in greater detail with reference to the following Examples, but it should be understood that the present invention is not deemed to be limited thereto. In these examples, all the percents are by weight unless otherwise indicated.

EXAMPLE 1

A mixture consisting of 19.8% of trimethylolpropane triacrylate as a polymerizable monomer, 0.2% of 2-hydroxy-2-methyl-1-phenylpropan-1-one as a polymerization initiator, and 80% of a liquid crystal material (A) shown below was prepared. A small amount of an alumina powder having an average particle size of 10 $\mu$m was added to the mixture as a spacer. The resulting mixture was inserted between a pair of ITO-coated glass plates (20 cm×20 cm), and the cell unit was irradiated with ultraviolet rays by passing under a metal halide lamp (80 W/cm) at a speed of 3.5 m/min to cure (polymerize) the monomer. The irradiated ultraviolet energy corresponded to 500 mJ/cm$^2$. The electrode gap of the device was 11 $\mu$m.

Scanning electron microscopic observation of the cross section of the light-control layer formed between the two glass substrates revealed exsistence of a polymer having the three dimensional network in the liquid crystal phase.

Liquid Crystal (A):

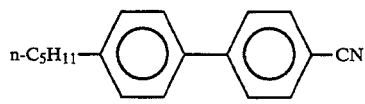

40%

-continued

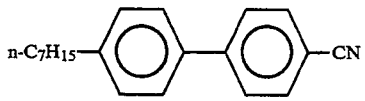 27%

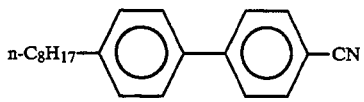 18%

($\Delta n = 0.21$; $\Delta \epsilon = 14$)

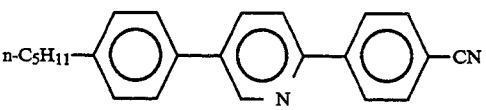 15%

($\Delta n = 0.4$; $\Delta \epsilon = 22$)

| Transition Temperature: | 69.1° C. (N-I point) |
|---|---|
|  | −35° C. (C-N point) |
| Refractive Index: | $n_e = 1.752$ |
|  | $n_0 = 1.522$ |
|  | $\Delta n = 0.230$ |
| Dielectric Anisotropy: | $\Delta \epsilon = 15$ |
| Threshold Voltage ($V_{th}$): | 1.50 V |
| Viscosity (20° C.): | 47.7 cp |

The resulting liquid crystal device had a threshold voltage, $V_{10}*^1 = 8.8$ V, $V_{90}*^1 = 20/0.5$ V, contrast ratio = 1:16, rise time = 2.3 msec, decay time = 18 msec, and number of multiplexing line $*^2 N_{max} = 2.1$.

*1: The percent transmission with no voltage applied being taken as 0%, and the maximum percent transmission reached by change of percent transmission with an increface of applied voltage being taken as 100%, the applied voltage attaining a percent transmission of 90% was taken as $V_{90}$, and that attaining a percent transmission of 10% was taken as $V_{10}$.
*2: The number of multiplexing line $N_{max}$ can be obtained by equation:

$$N_{max} = [(\alpha^2 + 1)/(\alpha^2 - 1)]^2$$

wherein $\alpha = V_{90}/V_{10}$.

EXAMPLE 2

A liquid crystal device was produced in the same manner as in Example 1, except for using a liquid crystal material (B) shown below in place of the liquid crystal material (A). A scanning electron microscopic observation of the cross section of the light-control layer formed between the two glass substrates revealed existence of a polymer having the three dimensional network in the liquid crystal phase.

Liquid Crystal Material (B):

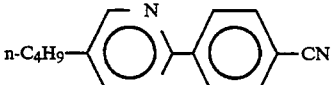 15%

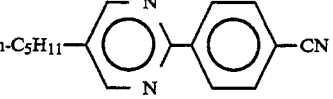 15%

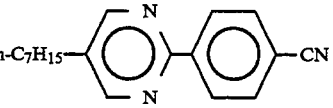 10%

($\Delta n = 0.21$; $\Delta \epsilon = 14$)

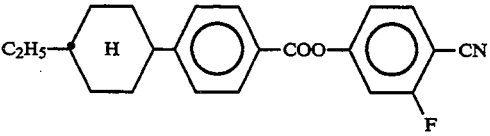 15%

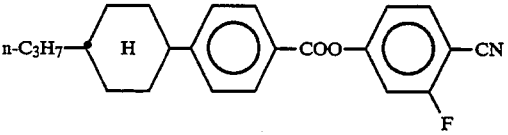 15%

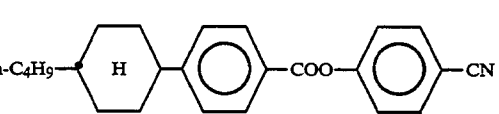 10%

($\Delta n = 0.20$; $\Delta \epsilon = 24$)

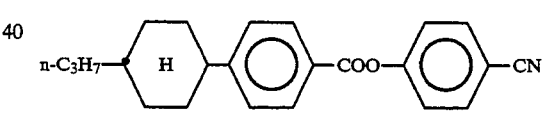 5%

 5%

($\Delta n = 0.19$; $\Delta \epsilon = 36$)

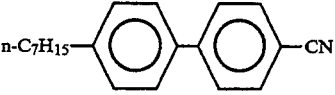 5%

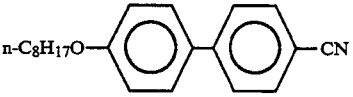 5%

($\Delta n = 0.20$; $\Delta \epsilon = 30$)

| Transition Temperature: | 68.0° C. (N-I point) |
|---|---|
|  | −13° C. (C-N point) |
| Refractive Index: | $n_e = 1.719$ |
|  | $n_0 = 1.516$ |
|  | $\Delta n = 0.203$ |
| Dielectric Anisotropy: | $\Delta \epsilon = 21$ |
| Threshold Voltage ($V_{th}$): | 1.16 V |
| Viscosity (20° C.): | 61.1 cp |

The resulting liquid crystal device had a threshold voltage; $V_{10} = 7.7$ V; $V_{90} = 14.9$ V; contrast ratio = 1:20; rise time = 2.7 msec; decay time = 3.8 msec; and $N_{max} = 3.0$.

EXAMPLE 3

A liquid crystal device was produced in the same manner as in Example 1, except for using a liquid crystal material (C) shown below in place of the liquid crystal material (A). A scanning electron microscopic observation of the cross section of-the light-control layer formed between the two glass substrates revealed existence of a polymer having the three dimensional network in the liquid crystal phase.

Liquid Crystal Material (C):

-continued

 10%

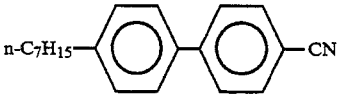 15%

 10%

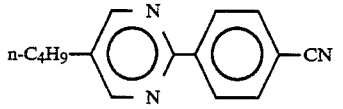 10%

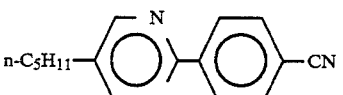 15%

(Δn = 0.20, Δε = 24)

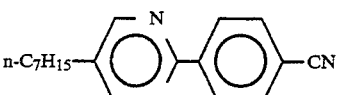 10%

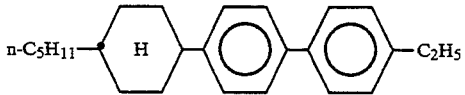 5%

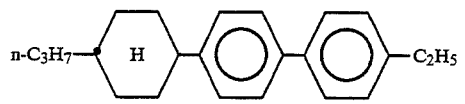 5%

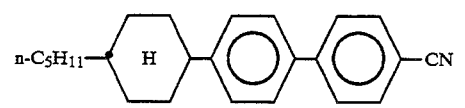 10%

(Δn = 0.25, Δε = 16)

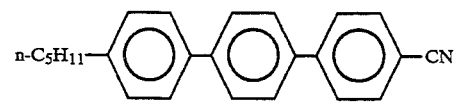 10%

(Δn = 0.38, Δε = 17)

| | |
|---|---|
| Transition Temperature: | 90.1° C. (N-I point) |
| | −6° C. (C-N point) |
| Refractive Index: | $n_e$ = 1.763 |
| | $n_0$ '2 1.523 |
| | Δn = 0.240 |
| Dielectric Anisotropy: | Δε = 17 |
| Threshold Voltage ($V_{th}$): | 1.39 V |
| Viscosity (20° C.): | 61.1 cp |

The resulting liquid crystal device had a threshold voltage; $V_{10}$=8.7 V; $V_{90}$=19.8 V; contrast ratio=1:21; rise time=2.7 msec; decay time=3.7 msec; and $N_{max}$=2.2.

EXAMPLE 4

A liquid crystal device was produced in the same manner as in Example 1, except for using a liquid crystal material (D) shown below in place of the liquid crystal material (A). A scanning electron microscopic observation of the cross section of the light-control layer formed between the two glass substrates revealed existence of a polymer having the three dimensional network in the liquid crystal phase, Liquid Crystal Material (D):

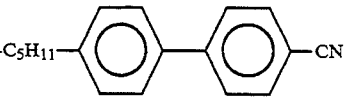 14%

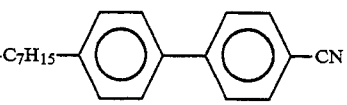 14%

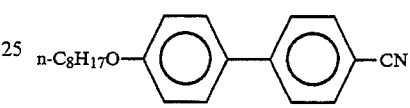 14%

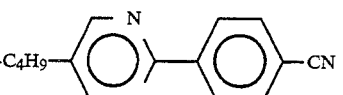 14%

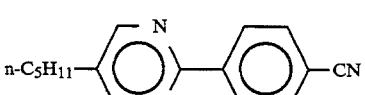 15%

(Δn = 0.20, Δε = 24)

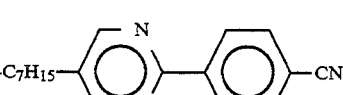 14%

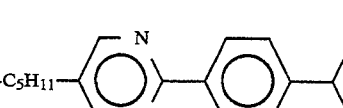 5%

(Δn = 0.34, Δε = 30)

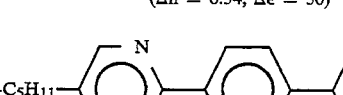 5%

(Δn = 0.29, Δε = 8)

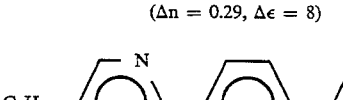 5%

| | |
|---|---|
| Transition Temperature: | 62.1° C. (N-I point) |
| | −9° C. (C-N point) |
| Refractive Index: | $n_e$ = 1.737 |
| | $n_0$ = 1.523 |
| | Δn = 0.214 |
| Dielectric Anisotropy: | Δε = 18 |

| | |
|---|---|
| Threshold Voltage ($V_{th}$): | 1.15 V |
| Viscosity (20° C.): | 60.2 cp |

The resulting liquid crystal device had a threshold voltage; $V_{10}=8.1$ V; $V_{90}=17.0$ V; contrast ratio=1:22; rise time=2.7 msec; decay time=3.8 msec; and $N_{max}=2.5$.

EXAMPLE 5

A liquid crystal device was produced in the same manner as in Example 1, except for using a liquid crystal material (E) shown below in place of the liquid crystal material (A). A scanning-electron microscopic observation of the cross section of the light-control layer formed between the two glass substrates revealed existence of a polymer having the three dimensional network in the liquid crystal phase.

Liquid Crystal Material (E):

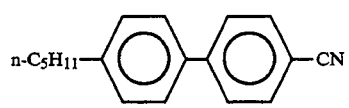
14%

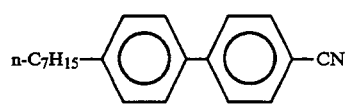
13%

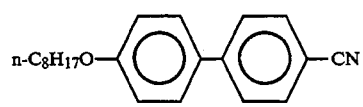
13%

($\Delta n = 0.21$, $\Delta\epsilon = 14$)

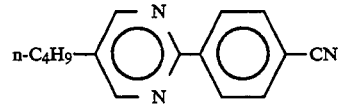
14%

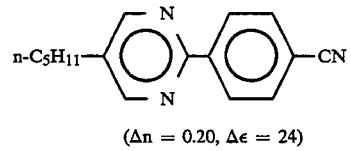
13%

($\Delta n = 0.20$, $\Delta\epsilon = 24$)

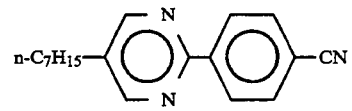
13%

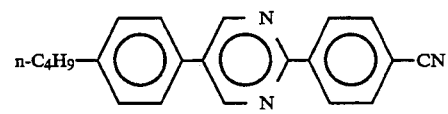
5%

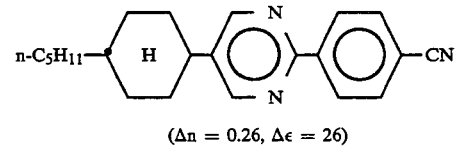
5%

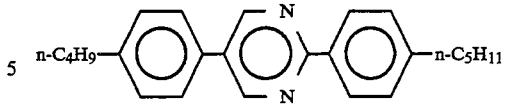
5%

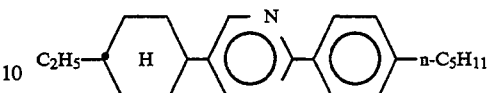
5%

| | |
|---|---|
| Transition Temperature: | 70.4° C. (N-I point) |
| | −7° C. (C-N point) |
| Refractive Index: | $n_e = 1.757$ |
| | $n_0 = 1.531$ |
| | $\Delta n = 0.226$ |
| Dielectric Anisotropy: | $\Delta\epsilon = 18$ |
| Threshold Voltage ($V_{th}$): | 1.11 V |
| Viscosity (20° C.): | 59.8 cp |

The resulting liquid crystal device had a threshold voltage; $V_{10}=7.9$ V; $V_{90}=15.8$ V; contrast ratio=1:20; rise time=2.5 msec; decay time=3.6 msec; and $N_{max}=2.8$.

EXAMPLE 6

A liquid crystal device was produced in the same manner as in Example 1, except for using a liquid crystal material (F) shown below in place of the liquid crystal material (A). A scanning electron microscopic observation of the cross section of the light-control layer formed between the two glass substrates revealed existence of a polymer having the three dimensional network in the liquid crystal phase, Liquid Crystal Material (F)

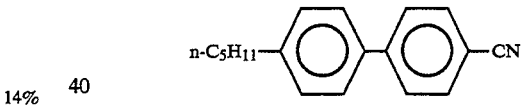
15%

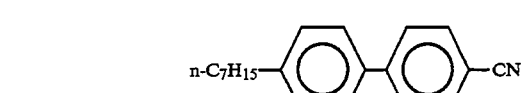
15%

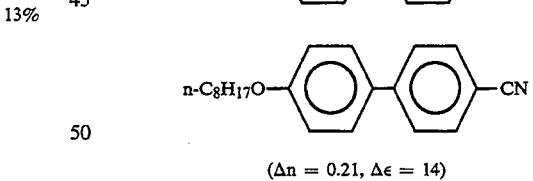
10%

($\Delta n = 0.21$, $\Delta\epsilon = 14$)

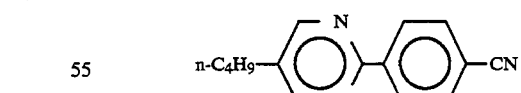
15%

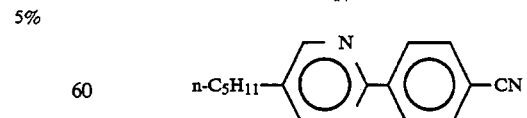
15%

($\Delta n = 0.20$, $\Delta\epsilon = 24$)

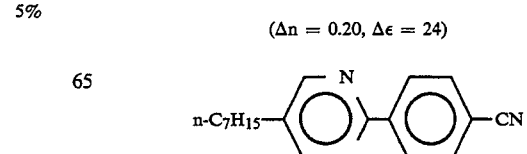
10%

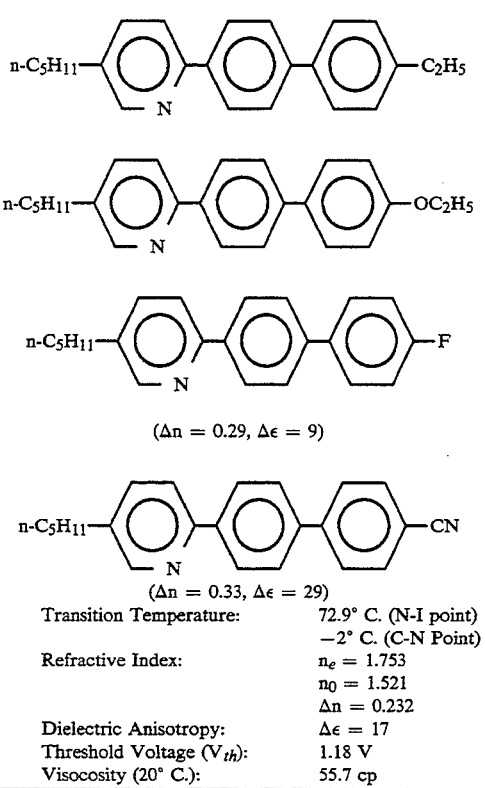

(Δn = 0.29, Δε = 9)

(Δn = 0.33, Δε = 29)

| Transition Temperature: | 72.9° C. (N-I point) |
| --- | --- |
|  | −2° C. (C-N Point) |
| Refractive Index: | $n_e$ = 1.753 |
|  | $n_0$ = 1.521 |
|  | Δn = 0.232 |
| Dielectric Anisotropy: | Δε = 17 |
| Threshold Voltage ($V_{th}$): | 1.18 V |
| Visocosity (20° C.): | 55.7 cp |

The resulting liquid crystal device had a threshold voltage; $V_{10}$=8.3 V; $V_{90}$=18.6 V; contrast ratio=1:18; rise time=2.5 msec; decay time=3.6 msec; and $N_{max}$=2.2.

EXAMPLE 7

A liquid crystal device was produced in the same manner as in Example 1, except for using a liquid crystal material (G) shown below in place of the liquid crystal material (A), A scanning-electron microscopic observation of the cross section of the light-control layer formed between the two glass substrates revealed existence of a polymer having the three dimensional network in the liquid crystal phase, Liquid Crystal material (G):

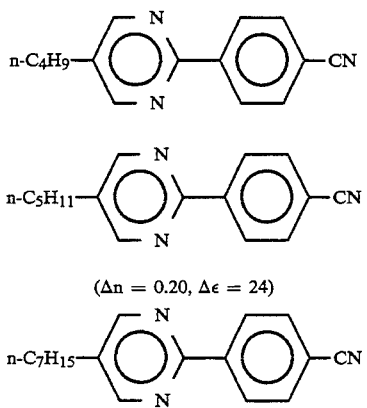

(Δn = 0.20, Δε = 24)

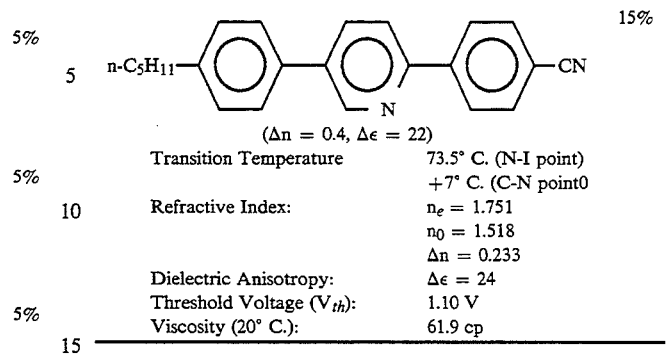

(Δn = 0.4, Δε = 22)

| Transition Temperature | 73.5° C. (N-I point) |
| --- | --- |
|  | +7° C. (C-N point0 |
| Refractive Index: | $n_e$ = 1.751 |
|  | $n_0$ = 1.518 |
|  | Δn = 0.233 |
| Dielectric Anisotropy: | Δε = 24 |
| Threshold Voltage ($V_{th}$): | 1.10 V |
| Viscosity (20° C.): | 61.9 cp |

The resulting liquid crystal device had a threshold voltage; $V_{10}$=7.9 V; $V_{90}$=13.6 V; contrast ratio=1:20; rise time=2.6 msec; decay time=23 msec; and $N_{max}$=4.1.

EXAMPLE 8

A liquid crystal device was produced in the same manner as in Example 1, except for using a liquid crystal material (H) shown below in place of the liquid crystal material (A). A scanning electron microscopic observation of the cross section of the light-control layer formed between the two glass substrates revealed existence of a polymer having the three dimensional network in the liquid crystal phase.

Liquid Crystal Material (H):

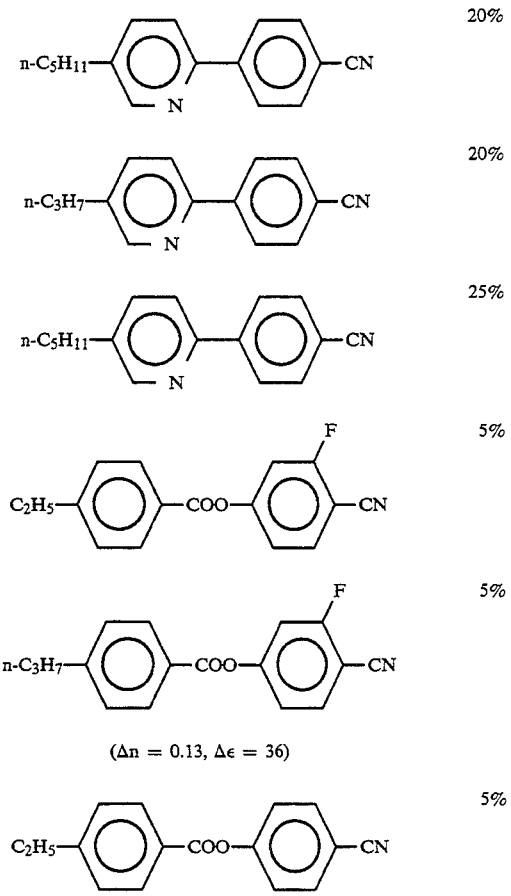

(Δn = 0.13, Δε = 36)

n-C₃H₇—⟨phenyl⟩—COO—⟨phenyl⟩—CN  5%

(Δn = 0.15, Δε = 29)

n-C₆H₁₃O—⟨phenyl⟩—⟨phenyl with N⟩—⟨phenyl⟩—CN  15%

| Transition Temperature: | 66.3° C. (N-I point) |
| --- | --- |
|  | −14° C. (C-N point) |
| Refractive Index: | $n_e$ = 1.769 |
|  | $n_0$ = 1.531 |
|  | Δn = 0.238 |
| Dielectric Anisotropy: | Δε = 25 |
| Threshold Voltage ($V_{th}$): | 1.00 V |
| Viscosity (20° C.): | 67.2 cp |

The resulting liquid crystal device had a threshold voltage; $V_{10}$=8.6 V; $V_{90}$=15.0 V; contrast ratio=1:20; rise time=2.5 msec; decay time=5.3 msec; and $N_{max}$=3.9.

EXAMPLE 9

A liquid crystal device was produced in the same manner as in Example 1, except for using a liquid crystal material (J) shown below in place of the liquid crystal material (A). A scanning electron microscopic observation of the cross section of the light-control layer formed between the two glass substrates revealed existence of a polymer having the three dimensional network in the liquid crystal phase.

Liquid Crystal Material (J):

n-C₅H₁₁—⟨phenyl⟩—COO—⟨phenyl⟩—CN  3% n-C₃H₇—⟨phenyl⟩—COO—⟨phenyl⟩—CN  3%

(Δn = 0.15, Δε = 29)

n-C₄H₉—⟨phenyl⟩—COO—⟨phenyl⟩—CN  7% n-C₂H₅—⟨phenyl⟩—COO—⟨phenyl-F⟩—CN  4% n-C₃H₇—⟨phenyl⟩—COO—⟨phenyl-F⟩—CN  4%

(Δn = 0.13, Δε = 36)

n-C₄H₉—⟨phenyl⟩—COO—⟨phenyl-F⟩—CN  4% n-C₇H₁₅—⟨phenyl⟩—COO—⟨phenyl-F⟩—CN  4%

C₂H₅—⟨H⟩—⟨phenyl⟩—COO—⟨phenyl-F⟩—CN  4% n-C₃H₇—⟨H⟩—⟨phenyl⟩—COO—⟨phenyl-F⟩—CN  4%

(Δn = 0.19, Δε = 36)

n-C₅H₁₁—⟨H⟩—⟨phenyl⟩—COO—⟨phenyl-F⟩—CN  4% n-C₅H₁₁—⟨phenyl⟩—⟨phenyl⟩—⟨phenyl⟩—CN  10%

(Δn = 0.38, Δε = 17)

n-C₅H₁₁—⟨H⟩—⟨phenyl⟩—⟨phenyl⟩—CN  10%

(Δn = 0.25, Δε = 16)

n-C₅H₁₁—⟨H⟩—⟨phenyl⟩—⟨phenyl⟩—C₂H₅  10% n-C₃H₇—⟨H⟩—⟨phenyl⟩—CN  19% n-C₅H₁₁—⟨phenyl⟩—⟨phenyl⟩—CN  10%

| Transition Temperature: | 87.2° C. (N-I point) |
| --- | --- |
|  | −9° C. (C-N point) |
| Refractive Index: | $n_e$ = 1.697 |
|  | $n_0$ = 1.506 |
|  | Δn = 0.191 |
| Dielectric Anisotropy: | Δε = 20 |
| Threshold Voltage ($V_{th}$): | 1.09 V |
| Viscosity (20° C.): | 52.3 cp |

The resulting liquid crystal device had a threshold voltage; $V_{10}=7.7$ V; $V_{90}=15.6$ V; contrast ratio=1:18; rise time=2.6 msec; decay time=3.8 msec; and $N_{max}=2.7$.

EXAMPLE 10

A liquid crystal device was produced in the same manner as in Example 1, except for using a liquid crystal material (K) shown below in place of the liquid crystal material (A). A scanning electron microscopic observation of the cross section of the light-control layer formed between the two glass substrates revealed existence of a polymer having the three dimensional network in the liquid crystal phase.

Liquid Crystal Material (K):

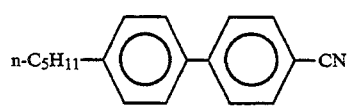  25%

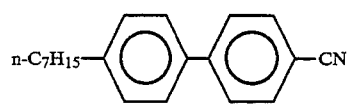  25%

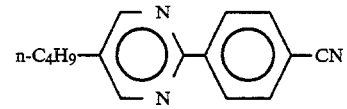  15%

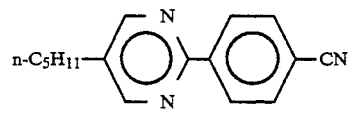  15%

($\Delta n = 0.20$, $\Delta\epsilon = 24$)

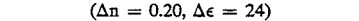  5%

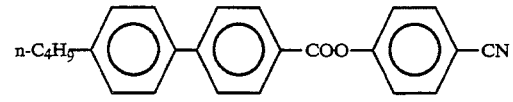  5%

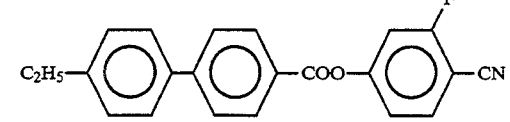  5%

($\Delta n = 0.26$, $\Delta\epsilon = 37$)

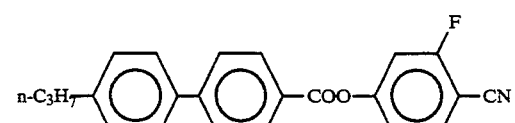  5%

| Transition Temperature: | 68° C. (N-I point) |
| --- | --- |
| | −8° C. (C-N point) |
| Refractive Index: | $n_e = 1.742$ |
| | $n_0 = 1.522$ |
| | $\Delta n = 0.220$ |
| Dielectric Anisotropy: | $\Delta\epsilon = 22$ |
| Threshold Voltage ($V_{th}$): | 1.09 V |
| Viscosity (20° C.): | 68.2 cp |

The resulting liquid crystal device had a threshold voltage; $V_{10}=7.6$ V; $V_{90}=15.1$ V; contrast ratio=1:21; rise time=2.7 msec; decay time=6.4 msec; and $N_{max}=2.8$.

COMPARATIVE EXAMPLE 1

A liquid crystal device was produced in the same manner as in Example 1, except for using a liquid crystal material (L) shown below in place of the liquid crystal material (A). A scanning electron microscopic observation of the cross section of the light-control layer formed between the two glass substrates revealed existence of a polymer having the three dimensional network in the liquid crystal phase.

Liquid Crystal Material (L):

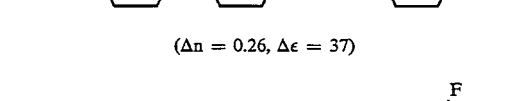  20%

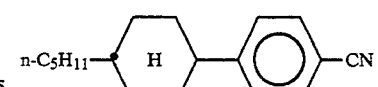  25%

  29%

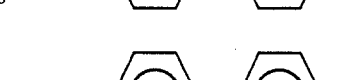  16%

  11%

| Transition Temperature: | 62.1° C. (N-I point) |
| --- | --- |
| | −25° C. (C-N point) |
| Refractive Index: | $n_e = 1.735$ |
| | $n_0 = 1.517$ |
| | $\Delta n = 0.218$ |
| Dielectric Anisotropy: | $\Delta\epsilon = 13.5$ |
| Threshold Voltage ($V_{th}$): | 1.51 V |
| Viscosity (20° C.): | 37.2 cp |

The resulting liquid crystal device had a threshold voltage; $V_{10}=15.6$ V; $V_{90}=41.1$ V; contrast ratio=1:14; rise time=2.8 msec; decay time=9.0 msec; and $N_{max}=1.8$. The device could not be applied to a multiplexing drive system because of the high $V_{10}$ value and the $N_{max}$ value less than 2.

COMPARATIVE EXAMPLE 2

A liquid crystal device was produced in the same manner as in Example 1, except for using a liquid crystal material (M) shown below in place of the liquid crystal material (A). A scanning electron microscopic observation of the cross section of the light-control layer formed between the two glass substrates revealed existence of a polymer having the three dimensional network in the liquid crystal phase.

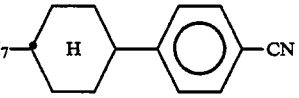

| Transition Temperature: | 65.9° C. (N-I point) |
| --- | --- |
| | −25° C. (C-N point) |
| Refractive Index: | $n_e = 1.633$ |
| | $n_0 = 1.500$ |
| | $\Delta n = 0.135$ |
| Dielectric Anisotropy: | $\Delta\epsilon = 23.7$ |
| Threshold Voltage ($V_{th}$): | 1.14 V |
| Viscosity (20° C.): | 39.5 cp |

The resulting liquid crystal device had a threshold voltage; $V_{10}=0.6.8$ V; $V_{90}=16.8$ V; contrast ratio=1:3; rise time=1.8 msec; decay time=14.0 msec; and $N_{max}=1.9$. The device exhibited poor contrast and could not be applied to a multiplexing drive system due to the $N_{max}$ value less than 2.

COMPARATIVE EXAMPLE 3

A liquid crystal device was produced in the same manner as in Example 1, except for using a liquid crystal material (N) shown below in place of the liquid crystal material (A). A scanning electron microscopic observation of the cross section of the light-control layer formed between the two glass substrates revealed existence of a polymer having the three dimensional network in the liquid crystal phase,

| Transition Temperature: | 72.5° C. (N-I point) |
| --- | --- |
| | −25° C. (C-N point) |
| Refractive Index: | $n_e = 1.630$ |
| | $n_0 = 1.492$ |
| | $\Delta n = 0.138$ |
| Dielectric Anisotropy: | $\Delta\epsilon = 12.3$ |
| Threshold Voltage ($V_{th}$): | 1.61 V |
| Viscosity (20° C.): | 27.5 cp |

The resulting liquid crystal device had a threshold voltage; $V_{10}=16.2$ V; $V_{90}=45.9$ V; contrast ratio=1:4; rise time=2.0 msec; decay time=5.3 msec; and $N_{max}=1.6$. The device exhibited poor contrast and could not be applied to a multiplexing drive system due to the high $V_{10}$ value and the $N_{max}$ value less than 2.

As described above, the liquid crystal device according to the present invention is a thin film type device, which can be driven at a low voltage of from about 14 to 21 V, exhibits a high rate of response as having a rise time of from 3 to 6 msec at such a low driving voltage, exhibits a transparent-opaque contrast as high as about 1:16 to 1:22, has a threshold voltage, and can be applied to a multiplexing-drive system at an about ½ to ¼ duty. The device is, therefore, extremely useful for light control, visual field control, large-area advertisement, and the like. In addition, the liquid crystal device of the present invention can be produced at low cost with great ease.

While the invention has been described in detail and with reference to specific embodiments thereof, it will be apparent to one skilled in the art that various changes and modifications can be made therein without departing from the spirit and scope thereof.

What is claimed is:

1. A liquid crystal device which comprises a pair of substrates having an electrode layer, at least one of said substrates being transparent, and a light-control layer supported between the substrates, wherein said light-control layer comprises a continuous liquid crystal phase composed of a nematic liquid crystal material and a transparent solid substance having a three dimensional network existing in said continuous liquid crystal phase, said nematic liquid crystal material having an optical anisotropy (Δn) ranging from 0.18 to 0.3 and a dielectric anisotropy (Δε) ranging from 15 to 25.

2. A liquid crystal device as claimed in claim 1, wherein said nematic liquid crystal material contains a nematic liquid crystal compound having an optical anisotropy (Δn) ranging from 0.19 to 0.4.

3. A liquid crystal device as claimed in claim 1, wherein said nematic liquid crystal material contains a compound represented by formula (I):

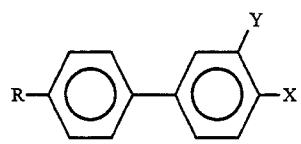

(I)

wherein R represents a straight chain alkyl, alkoxyl or alkenyl group having from 1 to 10 carbon atoms; X represents a fluorine atom or a cyano group; and Y represents a hydrogen atom or a fluorine atom.

4. A liquid crystal device as claimed in claim 1, wherein said nematic liquid crystal material contains a compound represented by formula (II):

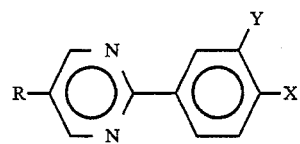

(II)

wherein R represents a straight chain alkyl, alkoxyl or alkenyl group having from 1 to 10 carbon atoms; X represents a fluorine atom or a cyano group; and Y represents a hydrogen atom or a fluorine atom.

5. A liquid crystal device as claimed in claim 1, wherein said nematic liquid crystal material contains a compound represented by formula (III):

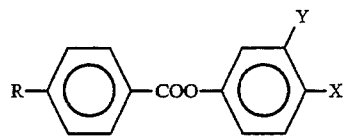

(III)

wherein R represents a straight chain alkyl, alkoxyl or alkenyl group having from 1 to 10 carbon atoms; X represents a fluorine atom or a cyano group; and Y represents a hydrogen atom or a fluorine atom.

6. A liquid crystal device as claimed in claim 1, wherein said nematic liquid crystal material contains a compound represented by formula (IV):

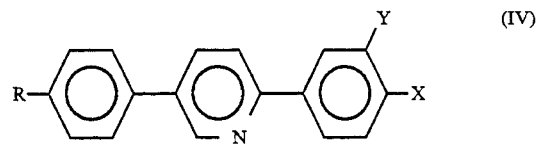

(IV)

wherein R represents a straight chain alkyl, alkoxyl or alkenyl group having from 1 to 10 carbon atoms; X represents a fluorine atom or a cyano group; and Y represents a hydrogen atom or a fluorine atom.

7. A liquid crystal-device as claimed in claim 1, wherein said nematic liquid crystal material contains a compound represented by formula (V):

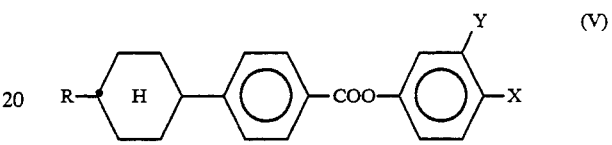

(V)

wherein R represents a straight chain alkyl, alkoxyl or alkenyl group having from 1 to 10 carbon atoms; X represents a fluorine atom or a cyano group; and Y represents a hydrogen atom or a fluorine atom.

8. A liquid crystal device as claimed in claim 1, wherein said nematic liquid crystal material contains a compound represented by formula (VI):

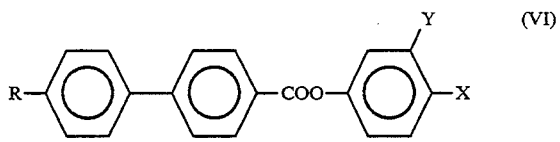

(VI)

wherein R represents a straight chain alkyl, alkoxyl or alkenyl group having from 1 to 10 carbon atoms; X represents a fluorine atom or a cyano group; and Y represents a hydrogen atom or a fluorine atom.

9. A liquid crystal device as claimed in claim 1, wherein said nematic liquid crystal material contains a compound represented by formula (VII):

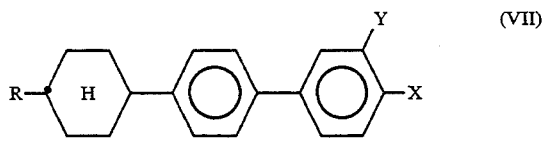

(VII)

wherein R represents a straight chain alkyl, alkoxyl or alkenyl group having from 1 to 10 carbon atoms; X represents a fluorine atom or a cyano group; and Y represents a hydrogen atom or a fluorine atom.

10. A liquid crystal device as claimed in claim 1, wherein said nematic liquid crystal material contains a compound represented by formula (VIII):

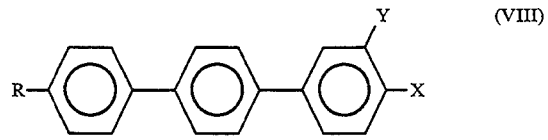

(VIII)

wherein R represents a straight chain alkyl, alkoxyl or alkenyl group having from 1 to 10 carbon atoms; X represents a fluorine atom or a cyano group; and Y represents a hydrogen atom or a fluorine atom.

11. A liquid crystal device as claimed in claim 1, wherein said nematic liquid crystal material contains a compound represented by formula (IX):

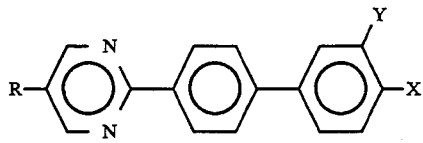

wherein R represents a straight chain alkyl, alkoxyl or alkenyl group having from 1 to 10 carbon atoms; X represents a fluorine atom or a cyano group; and Y represents a hydrogen atom or a fluorine atom.

12. A liquid crystal device as claimed in claim 1, wherein said nematic liquid crystal material contains a compound represented by formula (X):

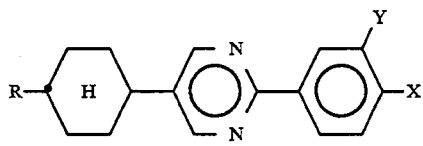

wherein R represents a straight chain alkyl, alkoxyl or alkenyl group having from 1 to 10 carbon atoms; X represents a fluorine atom or a cyano group; and Y represents a hydrogen atom or a fluorine atom.

13. A liquid crystal device as claimed in claim 1, wherein said nematic liquid crystal material contains a compound represented by formula (XI):

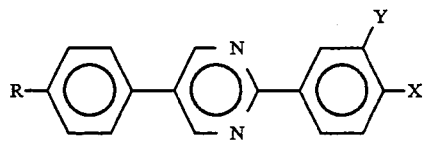

wherein R represents a straight chain alkyl, alkoxyl or alkenyl group having from 1 to 10 carbon atoms; X represents a fluorine atom or a cyano group; and Y represents a hydrogen atom or a fluorine atom.

14. A liquid crystal device as claimed in claim 1, wherein said nematic liquid crystal material contains a compound represented by formula (XII):

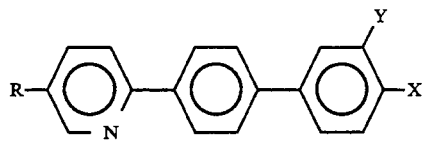

wherein R represents a straight chain alkyl, alkoxyl or alkenyl group having from 1 to 10 carbon atoms; X represents a fluorine atom or a cyano group; and Y represents a hydrogen atom or a fluorine atom.

15. A liquid crystal device as claimed in claim 1, wherein said nematic liquid crystal material contains a compound represented by formula (I):

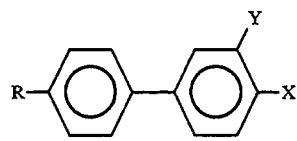

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (IV):

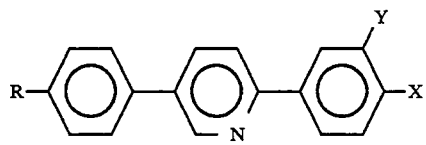

wherein R, X, and Y are as defined above.

16. A liquid crystal device as claimed in claim 1, wherein said nematic liquid crystal material contains a compound represented by formula (I):

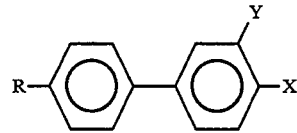

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (V):

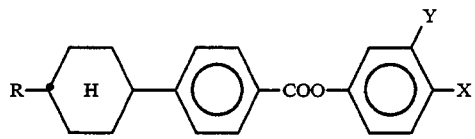

wherein R, X, and Y are as defined above.

17. A liquid crystal device as claimed in claim 1, wherein said nematic liquid crystal material contains a compound represented by formula (I):

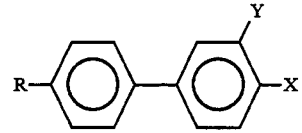

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (VI):

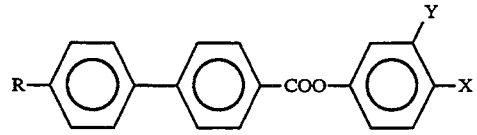

18. A liquid crystal device as claimed in claim 1, wherein said nematic liquid crystal material contains a compound represented by formula (I):

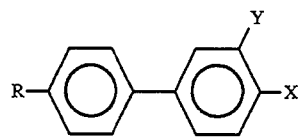
(I)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (VII):

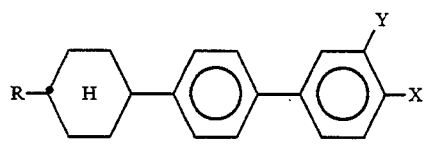
(VII)

wherein R, X, and Y are as defined above.

19. A liquid crystal device as claimed in claim 1, wherein said nematic liquid crystal material contains a compound represented by formula (I):

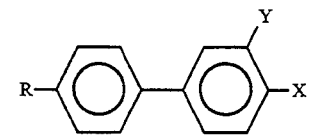
(I)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (VIII):

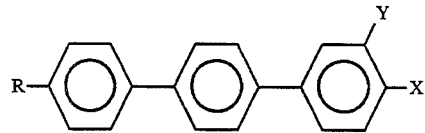
(VIII)

wherein R, X, and Y are as defined above.

20. A liquid crystal device as claimed in claim 1, wherein said nematic liquid crystal material contains a compound represented by formula (I):

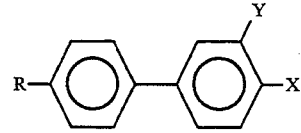
(I)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (IX):

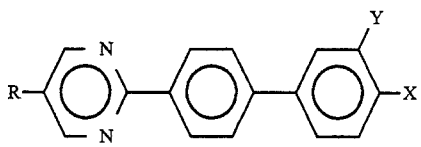
(IX)

wherein R, X, and Y are as defined above.

21. A liquid crystal device as claimed in claim 1, wherein said nematic liquid crystal material contains a compound represented by formula (I):

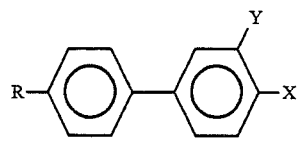
(I)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (X):

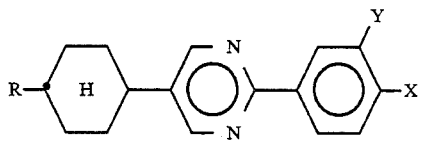
(X)

wherein R, X, and Y are as defined above.

22. A liquid crystal device as claimed in claim 1, wherein said nematic liquid crystal material contains a compound represented by formula (I):

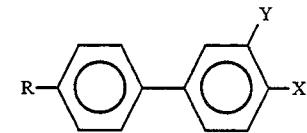
(I)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (XI):

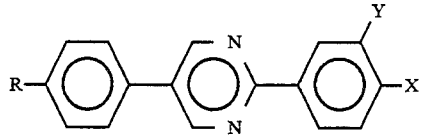
(XI)

wherein R, X, and Y are as defined above.

23. A liquid crystal device as claimed in claim 1, wherein said nematic liquid crystal material contains a compound represented by formula (I):

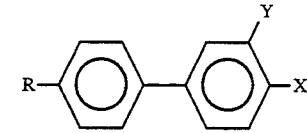
(I)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (XII):

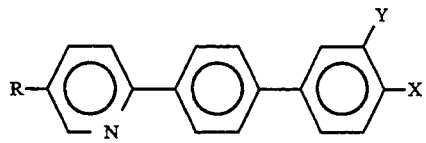

wherein R, X, and Y are as defined above.

24. A liquid crystal device as claimed in claim 1, wherein said nematic liquid crystal material contains a compound represented by formula II:

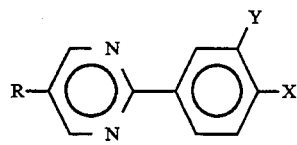

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (IV):

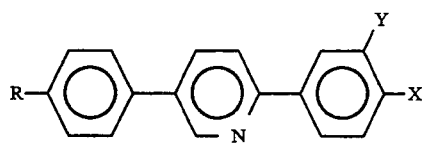

wherein R, X, and Y are as defined above.

25. A liquid crystal device as claimed in claim 1, wherein said nematic liquid crystal material contains a compound represented by formula (II):

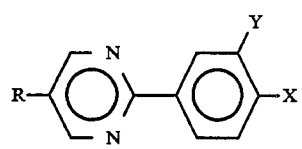

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (V):

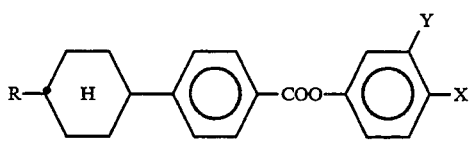

wherein R, X, and Y are as defined above.

26. A liquid crystal device as claimed in claim 1, wherein said nematic liquid crystal material contains a compound represented by formula (II):

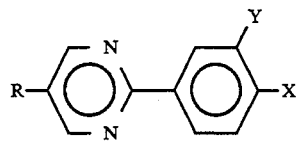

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (VI):

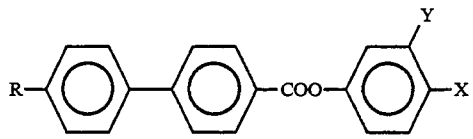

wherein R, X, and Y are as defined above.

27. A liquid crystal device as claimed in claim 1, wherein said nematic liquid crystal material contains a compound represented by formula (II):

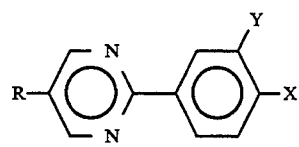

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (VII):

wherein R, X, and Y are as defined above.

28. A liquid crystal device as claimed in claim 1, wherein said nematic liquid crystal material contains a compound represented by formula (II):

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (VIII):

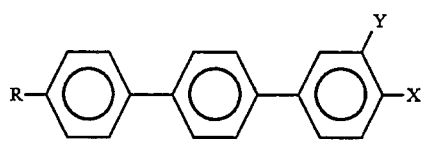

wherein R, X, and Y are as defined above.

29. A liquid crystal device as claimed in claim 1, wherein said nematic liquid crystal material contains a compound represented by formula (II):

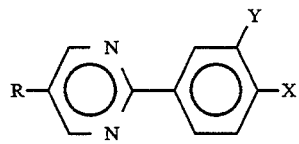
(II)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (IX):

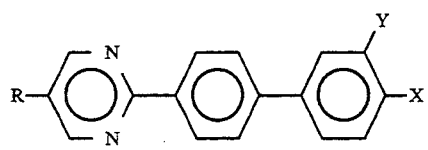
(IX)

wherein R, X, and Y are as defined above.

30. A liquid crystal device as claimed in claim 1, wherein said nematic liquid crystal material contains a compound represented by formula (II):

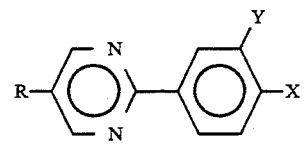
(II)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (X):

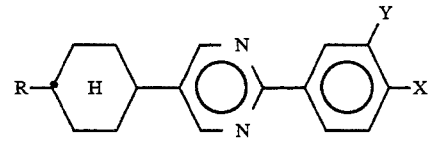
(X)

wherein R, X, and Y are as defined above.

31. A liquid crystal device as claimed in claim 1, wherein said nematic liquid crystal material contains a compound represented by formula (II):

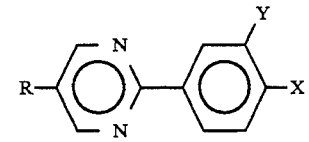
(II)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (XI):

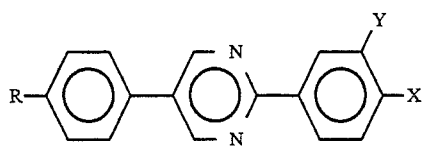
(XI)

wherein R, X, and Y are as defined above.

32. A liquid crystal device as claimed in claim 1, wherein said nematic liquid crystal material contains a compound represented by formula (II):

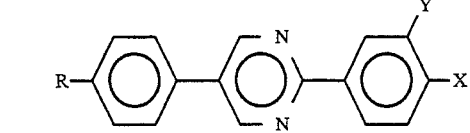
(II)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (XII):

(XII)

wherein R, X, and Y are as defined above.

33. A liquid crystal device as claimed in claim 1, wherein said nematic liquid crystal material contains a compound represented by formula (III):

(III)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (IV):

(IV)

wherein R, X, and Y are as defined above.

34. A liquid crystal device a claimed in claim 1, wherein said nematic liquid crystal material contains a compound represented by formula (III):

(III)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (VII):

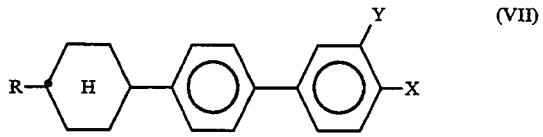
(VII)

wherein R, X, and Y are as defined above.

35. A liquid crystal device as claimed in claim 1, wherein said nematic liquid crystal material contains a compound represented by formula (III):

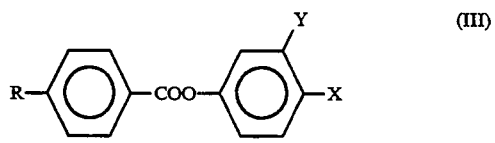
(III)

wherein R represents a straight chain alkyl, alkoxyl or alkenyl group having from 1 to 10 carbon atoms; X represents a fluorine atom or a cyano group; and Y represents a hydrogen atom or a fluorine atom, and a compound represented by formula (VIII):

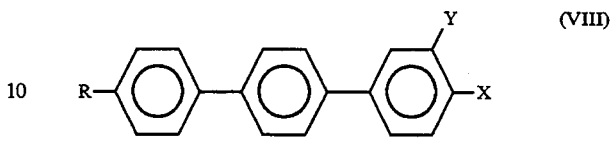
(VIII)

wherein R, X, and Y are as defined above.

36. A liquid crystal device as claimed in claim 1, wherein said nematic liquid crystal material is present in an amount of at least 60% by weight based on the light-control layer.

37. A liquid crystal device as claimed in claim 1, wherein said transparent solid substance is a synthetic resin.

38. A liquid crystal device as claimed in claim 1, wherein said light-control layer has a thickness of from 5 to 30 μm.

* * * * *